United States Patent [19]

Kasukave

[11] Patent Number: 4,572,013
[45] Date of Patent: Feb. 25, 1986

[54] INTERMITTENT LINK MECHANISM
[75] Inventor: Tetsuro Kasukave, Tokyo, Japan
[73] Assignee: Clarion Co., Ltd., Tokyo, Japan
[21] Appl. No.: 541,218
[22] Filed: Oct. 12, 1983
[30] Foreign Application Priority Data
Oct. 15, 1982 [JP] Japan .................. 57-179877
[51] Int. Cl.$^4$ .............................. G11B 5/54
[52] U.S. Cl. ..................... 74/50; 74/84 R; 74/112; 360/105
[58] Field of Search ............ 74/50, 435, 405, 84 R, 74/112; 360/105

[56] References Cited
U.S. PATENT DOCUMENTS

| 2,917,939 | 12/1959 | Harris | 74/435 |
| 4,023,813 | 5/1977 | Dennis | 74/435 |
| 4,442,467 | 4/1984 | Ikedo | 360/105 |

FOREIGN PATENT DOCUMENTS 2244613  5/1973  Fed. Rep. of Germany ........ 74/435

Primary Examiner—Craig R. Feinberg
Assistant Examiner—David A. Okonsky
Attorney, Agent, or Firm—Flynn, Thiel, Boutell & Tanis

[57] ABSTRACT

In an intermittent link mechanism including a driven gear engageable with a drive gear to cause a predetermined changeover operation and including a recess partly breaking the tooth train of the driven gear to intermittently breaking the linkage with the drive gear, the driven gear is integrally formed with a cam for engagement with a stopper to lock the driven gear at the disconnected position. The improvement comprises first spring biasing the stopper for continuous contact with the cam, a blocking surface and an urging corner both formed at one end of the stopper back to back with each other, an engagement surface formed in the cam for contact with the blocking surface, a slanting surface formed in the cam for contact with the urging corner, a pin formed on the driven gear and slidably received in an elongated slot formed in an changeover member, and second spring biasing the changeover member so as to apply a starting rotational force to the driven gear.

1 Claim, 1 Drawing Figure

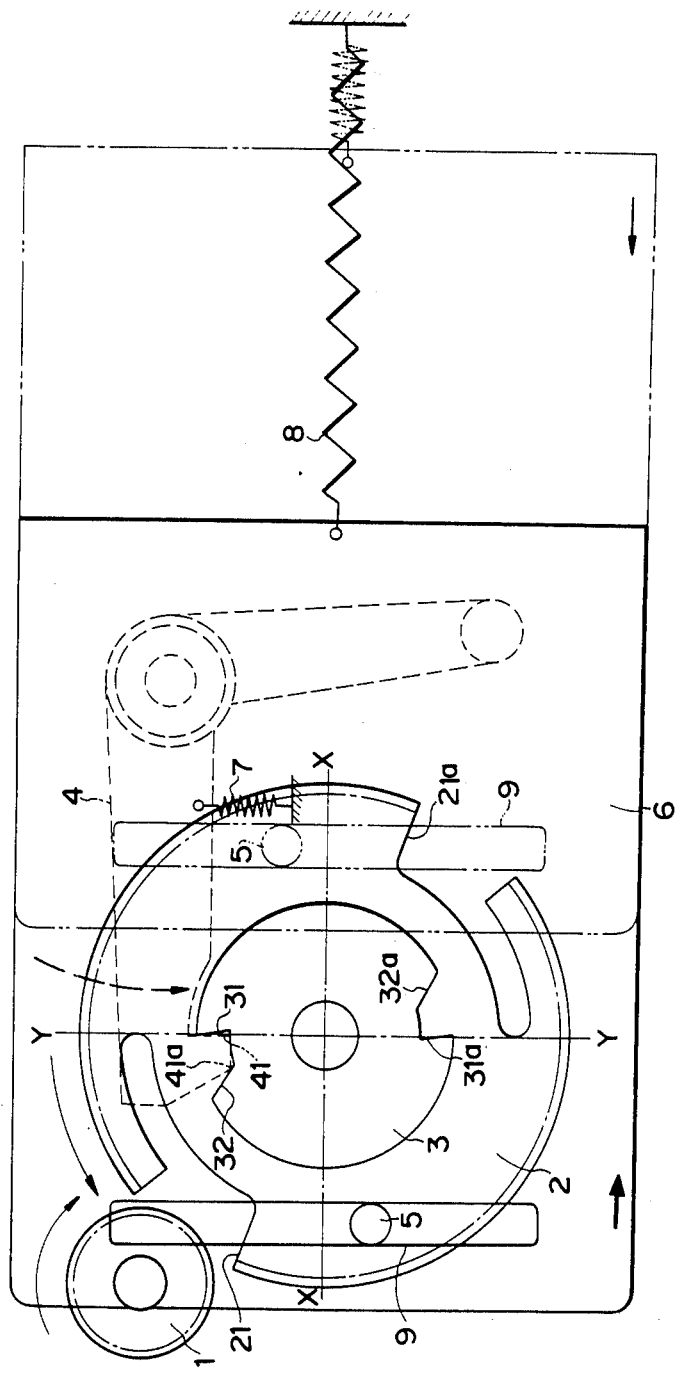

INTERMITTENT LINK MECHANISM

FIELD OF THE INVENTION

This invention relates to an intermittent link mechanism, and more particularly to such a mechanism capable of reliably breaking and recovering a linkage with a simple construction and capable of reliably effecting advantageous automatic changeover operations by use of the full stroke of an operating member linked to the link mechanism.

BACKGROUND OF THE INVENTION

It is today usual to automatically achieve head displacement and cassette loading and ejection in a tape player, for example, by use of a motor power. Such a system is remarkably advantageous because a variety of changeover operations are achieved with an extremely small power called "feather touch" as compared to an old-fashioned mechanism which requires a considerably large manual power for changeover operations.

To effect such automatic changeover operations, it is usual to employ a mechanism comprising a drive gear driven by a motor, a driven gear driven by the drive gear and having an engagement portion and a recess partly breaking the tooth train thereof, and a stopper for engagement with the engagement portion of the driven gear so that the recess faces the drive gear when the stopper engages the engagement portion, thereby cancelling the linkage relation between the drive gear and the driven gear. To recover the linkage relation from the disconnected state, the driven gear is biased by a spring, for example, so that when the stopper is disengaged from the engagement portion of the driven gear, the driven gear is rotated up to an angular position where the tooth train meshes the drive gear.

However, since the prior art mechanism having the above-described system requires a complicated and delicate structure to ensure disconnection and connection of the linkage elements, it cannot always achieve a reliable operation. For example, the spring adapted to apply a rotational force to the driven gear cannot always achieve its role because the force to rotate the driven gear becomes zero when a point for receiving the spring force is just on the line of the biasing force of the spring, or extremely small when the point is not so far from the line. This affects an operational stroke of an operating member responsive to the rotation of the driven gear for controlling other mechanisms, thereby causing a phenomenon that the operating member cannot achieve its expected controlling operation when the force to rotate the driven gear is substantially zero. In order to assure a predetermined operational stroke of the operating member to prevent the phenomenon, it will be necessary to employ a larger driven gear so that said extremely small rotation of the driven gear is out of the operational stroke of the member. This invites a bulky system and excessive movement of the mechanism. Particularly, in case that the driven gear is adapted to bring a head and pinch rollers ahead, it is important to effect their reliable and proper pressure contact with a tape within the operational stroke of said member and to detach the interlocking relation as maintaining the pressure contact of the head and pinch rollers for calling playback or recording mode. However, if said pressure contact is achieved and the interlocking connection is cancelled at a time when the driven gear is not provided with rotational force, i.e. when the point receiving the spring force is placed on the line of the biasing force, the linkage will not be actuated unless some other force is applied thereto, thereby greatly reducing the advantages of the automatically operative system.

OBJECT OF THE INVENTION

It is therefore an object of the invention to alleviate the above-mentioned drawback involved in the prior art, by providing an intermittent link mechanism excluding said disadvantages and not requiring any additional constituent.

SUMMARY OF THE INVENTION

To achieve the objective, the present invention provides an intermittent link mechanism which comprises:
a drive gear;
a driven gear having a recess partly breaking the tooth train thereof so as to intermittently engage with and be discontinuously driven by said drive gear:
a cam integrally formed with said driven gear;
a stopper engageable with said cam for locking the same;
first spring biasing said stopper for continuous contact with said cam;
a pin formed on said driven gear;
a changeover member having an elongated slot slidably receiving said pin therein; and
second spring biasing said changeover member so as to apply a starting rotational force to said driven gear.

BRIEF DESCRIPTION OF THE DRAWING

The drawing is a plan view illustrating an intermittent link mechanism embodying the invention wherein the driven gear 2 is disconnected from the drive gear 1.

DETAILED DESCRIPTION OF THE PREFERRED EMBODIMENT

The invention will now be described in detail by way of a preferred embodiment referring to the drawing. The drawing shows an intermittent link mechanism embodying the invention to be employed in a cassette tape recorder, for example. A drive gear 1 is driven by a motor of the tape recorder via a belt and a pulley. A driven gear 2 has recesses 21 and 21a partly and symmetrically breaking the tooth train of the driven gear 2 and is engageable with the drive gear 1. The driven gear 2 has a cam 3 integrally and concentrically formed therewith. The cam 3 is formed with two symmetric recesses defined by engagement surfaces 31 and 31a at the revolutionally rear end of the recesses and slanting surfaces 32 and 32a at the revolutionally front end. An L-shaped stopper 4 is pivotally supported near the driven gear 2 and includes a blocking surface 41 formed at one end portion thereof for engagement with the engagement surfaces 31 and 31a. First spring 7 connects the stopper 4 to the base plate of the tape player to always bias the stopper 4 for contact with the cam 3. The driven gear 2 also has a pin 5 adequately spaced from the rotation axle thereof so as to determine the position of a changeover member 6 having an elongated slot 9 receiving the pin 5 therein. Second spring 8 connects the changeover member 6 to the base plate or other fixed member of the player to produce a force perpendicular to that of the first spring 7 to recover the changeover member 6. An urging corner 41a is formed back to back with the blocking surface 41 so that as the blocking surface 41 is ushered deep into the recess of the cam 3 due to the energy of the spring 7, the urging corner 41a pushes the slanting surface 32 or 32a.

In place of the second spring 8, a spring (not shown) usually provided in the tape recorder for pushing pinch rollers to capstans (both not shown) may also be used for actuation of the changeover member 6. More specifically, the energy of a spring associated with one of the pinch rollers apart from the associated capstan may be conveyed to the changeover member 6 via an appropriate transmission means, thereby effecting the same operation as the second spring 8. When the driven gear includes the two symmetric recesses 21 and 21a and both the expanding and contracting forces of the spring are used, both the springs of two pinch rollers operative in the opposite directions may be used. Thus, whichever structure takes the place of the second spring 8, the object of the invention to provide an automatically operative mechanism with a simple construction can be achieved to the full extent.

The mechanism of the invention operates as follows. In the disconnected state of the drawing, the blocking surface 41 engages the engagement surface 31 and blocks the rotation of the cam 3 and the driven gear 2. Since the recess 21 is formed so that it faces the drive gear 1 when the engagement surface 31 is located at said position, the driven gear 2 never fails to stop the rotation and to escape from the driving force of the drive gear 1. In this disconnected state, if the engagement surface 31 stops along the Y—Y axis in the drawing, the pin 5 making an angle larger than 90° with the engagement surface 31 engages the elongated slot 9 of the changeover member 6 at a position overpassing the X—X axis intersecting with the Y—Y axis.

If the stopper 4 is thereafter applied with a rotating force in the clockwise direction in the drawing against the energy of the spring 7 by means of a plunger not shown, for example, the blocking surface 41 disengages from the engagement surface 31, thereby allowing the cam 3 and the driven gear 2 to rotate and engage the drive gear 1 in response to a movement of the pin 5 following to the changeover member 6 biased by the second spring 8. The driven gear 2 thereafter continues rotating with the rotation of the drive gear 1. It should be noted that, in the illustrated embodiment, the pulling force of the second spring 8 becomes zero when the driven gear 2 rotates 90 degrees ahead relative to the position of the drawing (i.e. when the changeover member 6 moves to the right by half the overall stroke thereof), and the spring 8 is thereafter forcibly contracted by further rotation of the driven gear 2 and further rightward movement of the changeover member 6.

When the changeover member 6 reaches the full, rightward extent, the recess 21a which was initially remote from the drive gear 1 now faces the drive gear 1, and the pin 5 in the elongated slot 9 at the position shown by the imaginary line is located just on the X—X axis. At the same time, the urging corner 41a of the stopper 4 pushes the slanting surface 32a of the other recess of the cam 3, thereby rotating the cam 3 and the driven gear 2 a little so that the blocking surface 41 fully engages the engaging surface 31a. When the pin 5 is moved to the position a little overpassing the X—X axis as shown by the imaginary line, the driven gear 2 is reliably kept disengaged from the drive gear 1 due to the locking engagements between the blocking surface 41 and the engaging surface 31a and between the urging corner 41a and the slanting surface 32a as it was effected by the engaging surface 31 and the slanting surface 32.

Sequentially describing again, the driven gear 2 is reliably rotated by the drive gear 1 to the angular position wherein the pin 5 is just on the X—X axis.

The blocking surface 41 enters in the recess of the cam 3 and the urging corner 41a pushes the slanting surface 32a. Thereby, the driven gear 2 is rotated a little up to the angular position wherein the drive gear 1 is located at the center of the recess 21 of the driven gear. In this angular position, the blocking surface 41 engages the engaging surface 31a and the urging corner 41a is at the bottom of the recess, thereby locking the driven gear 2 unrotatably in either direction and reliably maintaining the disconnected relation. In this state, the pin 5 is located at the position a little overpassing the X—X axis.

When the stopper 4 is disengaged from the engaging surface 31a, the driven gear 2 is rotated and brought into meshing engagement with the drive gear 1 as it was when the stopper 4 was disengaged from the engaging surface 31. In this case, however, the rotation of the driven gear 2 is effected because the pin 5 is pushed to the left by the change-over plate 6 which is pushed by the spring 8 returning from the contracted state. The driven gear 2 is thereafter driven by the drive gear 1, expanding the spring 8. Thus, the full stroke of the changeover member 6 can be used for the change-over operation.

As described above, according to the invention, the urging corner is formed back to back with the blocking surface for locking the cam concurrently rotatable with the driven gear at a position for interruption of the linkage between the drive gear and the driven gear, and the cam is provided with the engaging surface for engagement with the blocking surface and the slanting surface for contact with the urging corner. Therefore, as the blocking surface engages the engaging surface, the urging corner rotates the cam and the driven gear up to such an extent that the drive gear is positioned at the center of the recess, thereby reliably breaking the linkage between the gears. To break the linkage, the mechanism does not require any additional and unique elements and merely employs a small modification to the stopper and the cam. Additionally, since the driven gear is rotated a little upon the disconnection by the spring biasing the stopper, the driven gear is disposed at such an angular position that the biasing force of the spring connected to the changeover member reliably rotates the driven gear to effect the next linkage between the gears even if the full stroke of the changeover member is used for the changeover operation. It should be noted that the recovery of the linkage does not require any additional elements, either. The feature that the full stroke of the changeover member can be used only for the changeover operation allows reduction in size of the changeover member and the driven gear. Particularly, the full stroke of the changeover member is fully used for displacement of a head and pinch rollers for calling playback or recording mode so as to smoothly effect such automatic operations. Thus, the invention is greatly, industrially advantageous.

I claim:
1. An intermittent link mechanism which comprises:
a drive gear;

a driven gear having two circumferentially spaced-apart recesses partly breaking a tooth train thereof so as to intermittently engage with and be discontinuously driven by said drive gear;

a cam integrally formed with said driven gear, said cam having two circumferentially spaced-apart sets of surfaces, each set of surfaces including an engagement surface and a slanting surface;

a stopper engageable with said cam for locking the same, said stopper being formed at one end thereof with a projection including a blocking surface engageable with an engaging surface of said cam and an urging portion engageable with a slanting surface of said cam;

a first spring biasing said stopper for continuous contact with said cam;

a pin formed on said driven gear;

a changeover member having an elongated slot slidably receiving said pin therein; and a second spring biasing force said changeover member so as to apply a starting rotational force to said driven gear.

* * * * *